(12) United States Patent
Geirhofer et al.

(10) Patent No.: US 9,936,494 B2
(45) Date of Patent: Apr. 3, 2018

(54) RANDOMIZATION PROCEDURE FOR ASSIGNING INTERFERENCE MEASUREMENT RESOURCES IN WIRELESS COMMUNICATION

(71) Applicant: QUALCOMM Incorporated, San Diego, CA (US)

(72) Inventors: Stefan Geirhofer, San Diego, CA (US); Peter Gaal, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/435,819

(22) Filed: Feb. 17, 2017

(65) Prior Publication Data
US 2017/0164339 A1  Jun. 8, 2017

Related U.S. Application Data

(62) Division of application No. 13/781,605, filed on Feb. 28, 2013, now Pat. No. 9,609,537.

(60) Provisional application No. 61/707,855, filed on Sep. 28, 2012.

(51) Int. Cl.
| | |
|---|---|
| *H04W 72/04* | (2009.01) |
| *H04W 72/08* | (2009.01) |
| *H04W 24/10* | (2009.01) |
| *H04L 5/00* | (2006.01) |

(52) U.S. Cl.
CPC ......... *H04W 72/042* (2013.01); *H04L 5/0035* (2013.01); *H04W 24/10* (2013.01); *H04W 72/0413* (2013.01); *H04W 72/082* (2013.01)

(58) Field of Classification Search
CPC .................................................... H04W 24/10
USPC ........................................................ 370/252
See application file for complete search history.

(56) References Cited

U.S. PATENT DOCUMENTS

| | | | |
|---|---|---|---|
| 9,008,585 B2* | 4/2015 | Xiao | H04W 72/082 |
| | | | 455/63.1 |
| 9,369,922 B2* | 6/2016 | Han | H04W 28/12 |
| 2009/0300195 A1* | 12/2009 | Devdhar | H04L 45/00 |
| | | | 709/229 |
| 2011/0194536 A1 | 8/2011 | Kim et al. | |

(Continued)

FOREIGN PATENT DOCUMENTS

| | | |
|---|---|---|
| JP | 2011518461 A | 6/2011 |
| WO | 2009113951 A1 | 9/2009 |
| WO | 2011105726 A2 | 9/2011 |

OTHER PUBLICATIONS

International Search Report and Written Opinion—PCT/US2013/061498—ISA/EPO—dated Feb. 25, 2014.

(Continued)

*Primary Examiner* — Shripal Khajuria
(74) *Attorney, Agent, or Firm* — Harrity & Harrity, LLP

(57) ABSTRACT

Methods and apparatus are provided for assigning interference measurement resources. A method includes receiving at least one identifier, which determines, at least in part, at least one interference measurement resource that partially overlaps with another at least one interference measurement resource. The at least one interference measurement resource comprises a number of resource elements out of a set of resource elements. The method also includes measuring interference based at least in part on the at least one interference measurement resource.

25 Claims, 12 Drawing Sheets

(56) References Cited

U.S. PATENT DOCUMENTS

| | | | |
|---|---|---|---|
| 2012/0188955 A1 | 7/2012 | Zhang | |
| 2012/0208547 A1 | 8/2012 | Geirhofer et al. | |
| 2012/0213261 A1 | 8/2012 | Sayana et al. | |
| 2012/0257664 A1* | 10/2012 | Yue | H04B 7/0452 375/227 |
| 2012/0300641 A1* | 11/2012 | Chen | H04L 1/0026 370/241 |
| 2012/0315859 A1 | 12/2012 | Lee et al. | |
| 2013/0021925 A1* | 1/2013 | Yin | H04B 7/024 370/252 |
| 2014/0092760 A1 | 4/2014 | Geirhofer et al. | |

OTHER PUBLICATIONS

NTT DOCOMO: "Enhanced Interference Measurement Mechanism for Rel-11," 3GPP Draft; R1-121471 Interference Estimation, 3rd Generation Partnership Project (3GPP), Mobile Competence Centre; 650, Route Des Lucioles; F-06921 Sophia-Antipolis Cedex; France, vol. RAN WG1, no. Jeju, Korea; Mar. 26, 2012-Mar. 30, 2012, Mar. 20, 2012 (Mar. 20, 2012), pp. 1-9, XP050599752, [retrieved on Mar. 20, 2012], chapter 3, 3.2.

NTT DOCOMO, et al., "Way Forward on Interference Measurement in Rel-11", 3GPP Draft; R1-123914 WF on Interference Measurement, 3rd Generation Partnership Project (3GPP), Mobile Competence Centre; 650, Route Des Llicioles; F-06921 Sophia-Antipolis Cedex; France, vol. RAN WG1, no. Qingdao, China; 20120813-2012081714 Aug. 2012 (Aug. 14, 2012), XP050661746, 2 Pages.

NTT DOCOMO, et al., "Way Forward on Interference Measurement in Rel-11," 3GPP Draft, R1-123982 Way Forward on Interference Measurement in Rel-11, 3rd Generation Partnership Project (3GPP), Mobile Competence Centre; 650, Route Des Lucioles; F-06921 Sophia-Antipolis Cedex; France, vol. RAN WG1, no. Qingdao, China; Aug. 13, 2012-Aug. 17, 2012 Aug. 17, 2012 (Aug. 17, 2012), XP002720166, 4 pages, Retrieved from the Internet< URL: http://www.3gpp.org/ftp/tsg_ran/WG1_RL1/TSGR1_70/Docs/>, [retrtieved on Feb. 12, 2014], p. 2 and p. 7 of the presentation.

QUALCOMM INCORPORATED: "Remaining details of CSI Configuration Aspects,"3GPP Draft; R1-124443 Remaining Details of CSI Configuration Aspects, 3rd Generation Partnership Project (3GPP), Mobile Competence Centre; 650, Route Des Lucioles, F-06921 Sophia-Antipolis Cedex; F, vol. RAN WG1, no. San Diego, USA; Oct. 8, 2012-Oct. 12, 2012 (Sep. 29, 2012), XP050662334, 3 pages, Retrieved from the Internet< URL: http://www.3gpp.org/ftp/tsg_ran/wg1_RL1/TSGR1_70b/Docs/>, [retrieved on Sep. 29, 2012], the whole document.

ZTE: "Evaluation and discussion on interference measurement," 3GPP Draft; R1-121043_Interference_Measurement, 3rd Generation Partnership Project (3GPP), Mobile Competence Centre; 650, Route Des Lucioles; F-06921 Sophia-Antipolis Cedex; France, vol. RAN WG1, no. Jeju, Korea; Mar. 26, 2012-Mar. 30, 2012, Mar. 20, 2012 (Mar. 20, 2012), XP050599347, pp. 1-12, [retrieved on Mar. 3, 2012], Chapter 3.

* cited by examiner

NO OVERLAPPING STAGE 1 BLOCKS

2 OVERLAPPING STAGE 1 BLOCKS

RANDOMIZATION PROCEDURE FOR ASSIGNING INTERFERENCE MEASUREMENT RESOURCES IN WIRELESS COMMUNICATION

CROSS-REFERENCE TO RELATED APPLICATION

This application is a divisional of U.S. patent application Ser. No. 13/781,605, filed Feb. 28, 2013, which claims priority to Provisional Application No. 61/707,855, filed Sep. 28, 2012, entitled "RANDOMIZATION PROCEDURE FOR ASSIGNING INTERFERENCE MANAGEMENT RESOURCES IN LTE", both of which are assigned to the assignee hereof, and are hereby expressly incorporated in their entirety by reference herein.

FIELD

The present disclosure relates to communication systems and to techniques for assigning interference measurement resources in wireless communication.

BACKGROUND

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of mobile entities, such as, for example, user equipments (UEs). A UE may communicate with a base station via the downlink (DL) and uplink (UL). The DL (or forward link) refers to the communication link from the base station to the UE, and the UL (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs.

In recent years, users have started to replace fixed line broadband communications with mobile broadband communications and have increasingly demanded great voice quality, reliable service, and low prices, especially at their home or office locations. In order to provide indoor services, network operators may deploy different solutions. For networks with moderate traffic, operators may rely on macro cellular base stations to transmit the signal into buildings. However, in areas where building penetration loss is high, it may be difficult to maintain acceptable signal quality, and thus other solutions are desired. New solutions are frequently desired to make the best of the limited radio resources such as space and spectrum.

SUMMARY

Methods and apparatus for assigning interference measurement resources are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method of wireless communication includes receiving at least one identifier wherein the at least one identifier determines, at least in part, at least one interference measurement resource that partially overlaps with another at least one interference measurement resource, wherein the at least one interference measurement resource comprises a number of resource elements out of a set of resource elements. The method includes measuring interference based at least in part on the at least one interference measurement resource.

In another aspect, a wireless communication apparatus includes at least one processor configured to (a) receive at least one identifier wherein the at least one identifier determines, at least in part, at least one interference measurement resource that partially overlaps with another at least one interference measurement resource, wherein the at least one interference measurement resource comprises a number of resource elements out of a set of resource elements, and (b) measure interference based at least in part on the at least one interference measurement resource. The wireless communication apparatus includes a memory coupled to the at least one processor for storing data.

In another aspect, a wireless communication apparatus includes means for receiving at least one identifier wherein the at least one identifier determines, at least in part, at least one interference measurement resource that partially overlaps with another at least one interference measurement resource, wherein the at least one interference measurement resource comprises a number of resource elements out of a set of resource elements. The wireless communication apparatus includes means for measuring interference based at least in part on the at least one interference measurement resource.

In another aspect, a computer program product includes a computer-readable medium including code for causing at least one computer to receive at least one identifier wherein the at least one identifier determines, at least in part, at least one interference measurement resource that partially overlaps with another at least one interference measurement resource, wherein the at least one interference measurement resource includes a number of resource elements out of a set of resource elements. The computer-readable medium includes code for causing the at least one computer to measure interference based at least in part on the at least one interference measurement resource.

In another aspect, a method of wireless communication includes transmitting an identifier of a network entity to at least one mobile entity, the identifier determining, at least in part, at least one interference measurement resource that partially overlaps with another at least one interference measurement resource, wherein the at least one interference measurement resource comprises a number of resource elements out of a set of resource elements. The method includes receiving channel state information (CST) reports from at least one mobile entity based on the at least one interference measurement resource.

In another aspect, a wireless communication apparatus includes at least one processor configured to (a) transmit an identifier of a network entity to at least one mobile entity, the identifier determining, at least in part, at least one interference measurement resource that partially overlaps with another at least one interference measurement resource, wherein the at least one interference measurement resource comprises a number of resource elements out of a set of resource elements, and (b) receive channel state information (CSI) reports from at least one mobile entity based on the at least one interference measurement resource. The wireless communication apparatus includes a memory coupled to the at least one processor for storing data.

In another aspect, a wireless communication apparatus includes means for transmitting an identifier of a network entity to at least one mobile entity, the identifier determining, at least in part, at least one interference measurement resource that partially overlaps with another at least one interference measurement resource, wherein the at least one interference measurement resource comprises a number of resource elements out of a set of resource elements. The wireless communication apparatus includes means for receiving channel state information (CSI) reports from at least one mobile entity based on the at least one interference measurement resource.

In another aspect, a computer program product includes a computer-readable medium comprising code for causing at least one computer to transmit an identifier of a network entity to at least one mobile entity, the identifier determining, at least in part, at least one interference measurement resource that partially overlaps with another at least one interference measurement resource, wherein the at least one interference measurement resource comprises a number of resource elements out of a set of resource elements. The computer-readable medium includes code for causing the at least one computer to receive channel state information (CSI) reports from at least one mobile entity based on the at least one interference measurement resource.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA, cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS. LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
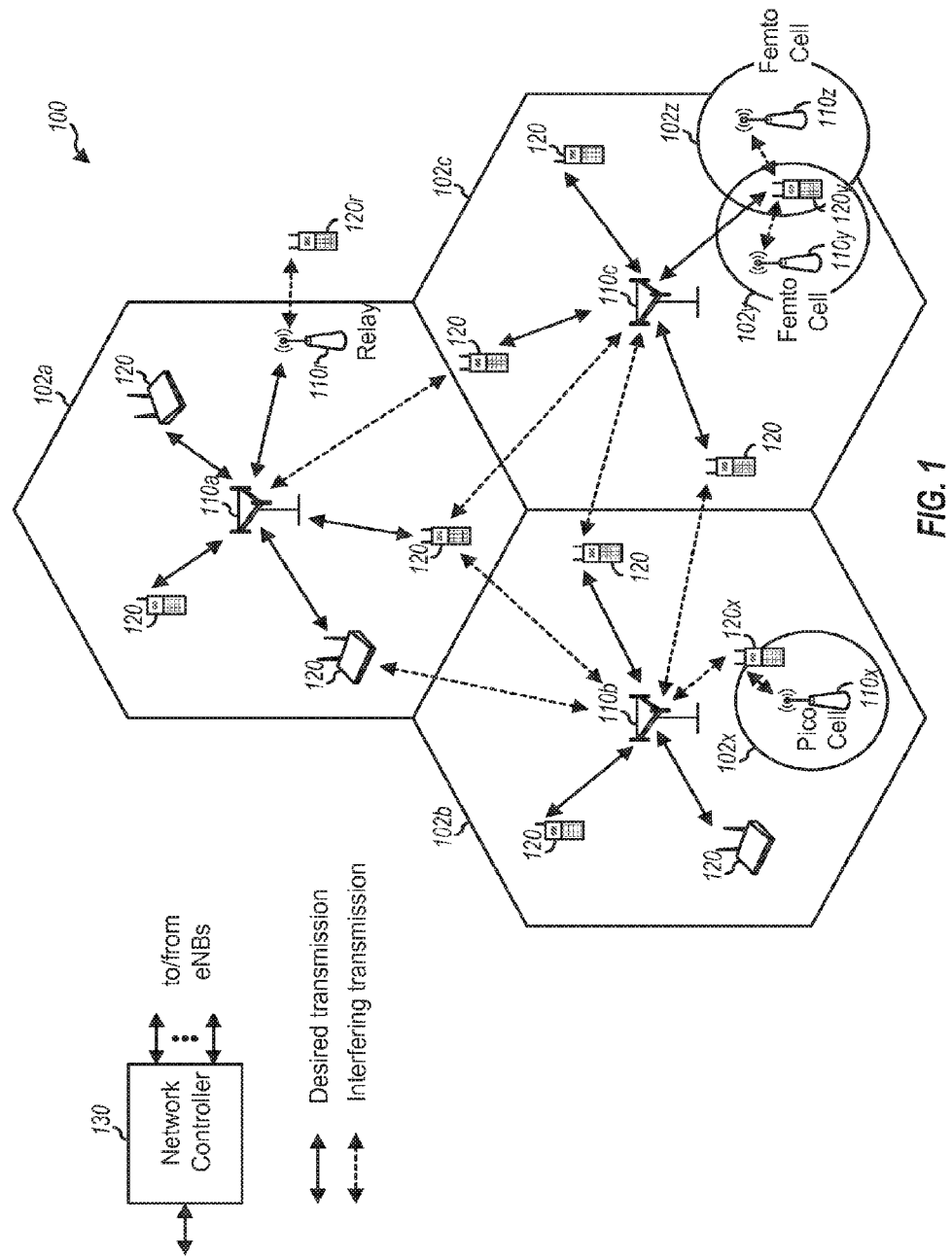
FIG. 1 is a block diagram conceptually illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG). UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
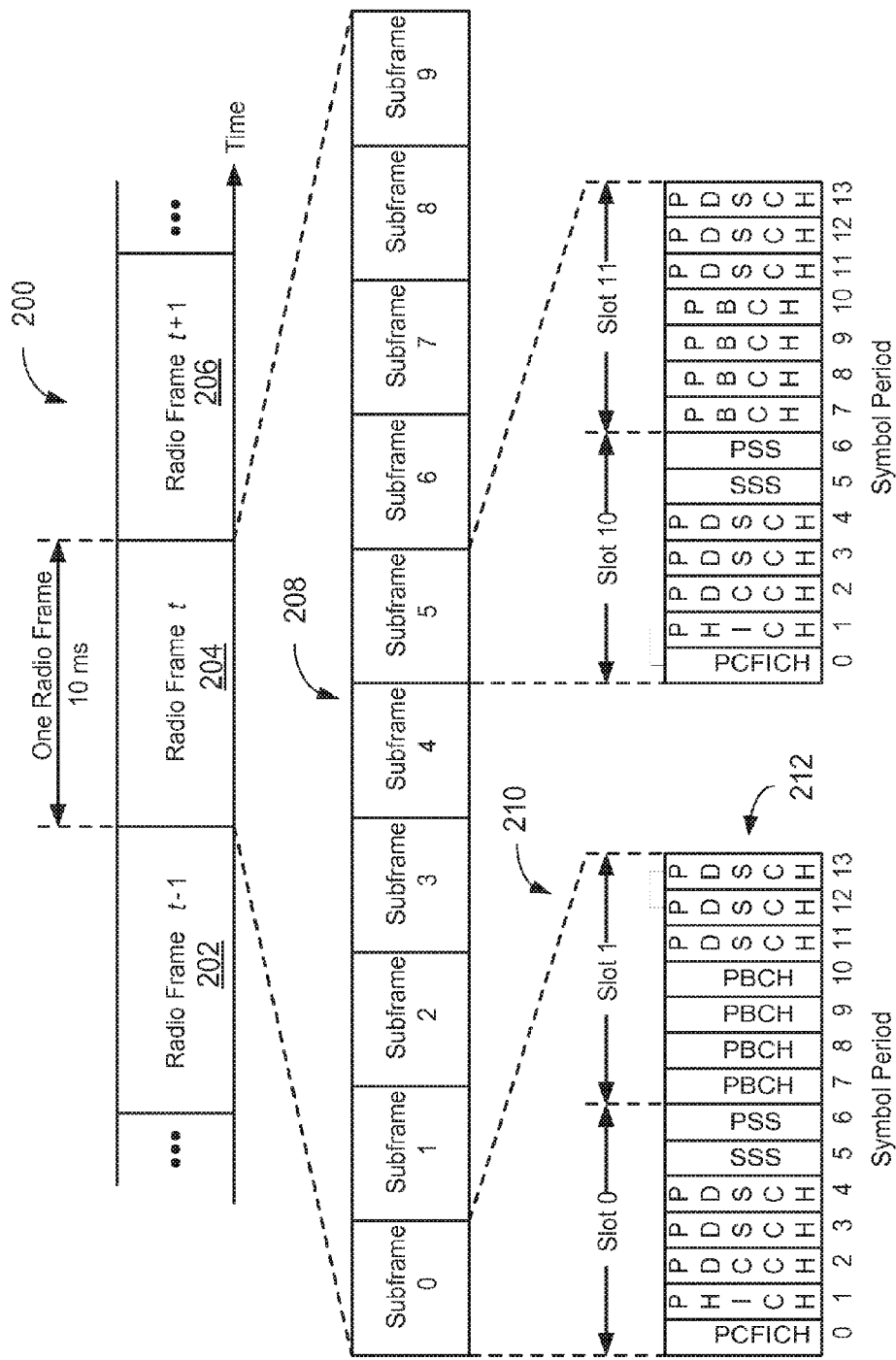
FIG. 2 is a block diagram conceptually illustrating an example of a down link frame structure in a telecommunications system.
Figure 6:
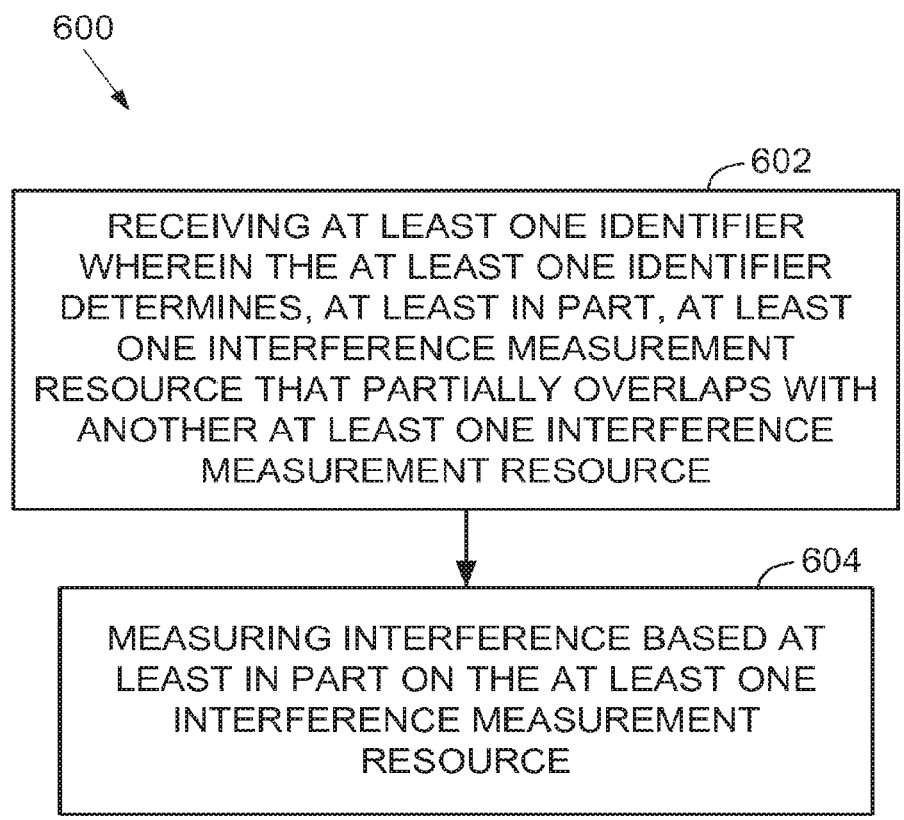
FIG. 6 illustrates an exemplary methodology for measuring interference resources.

FIG. 2 shows a down link frame structure used in LTE. The transmission timeline for the downlink may be partitioned into units of radio frames. Each radio frame, for example, frame 202, may have a predetermined duration (e.g., 10 milliseconds (ms)) and may be partitioned into 10 subframes 204 with indices of 0 through 9. Each subframe, for example 'Subframe 0' 206, may include two slots, for example, 'Slot 0' 208 and 'Slot 1' 210. Each radio frame may thus include 20 slots with indices of 0 through 19. Each slot may include L symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period 214 in FIG. 2. The PCFICH may convey the number of symbol periods (M) used for control channels, where M may be equal to 1, 2 or 3 and may change from subframe to subframe. M may also be equal to 4 for a small system bandwidth. e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
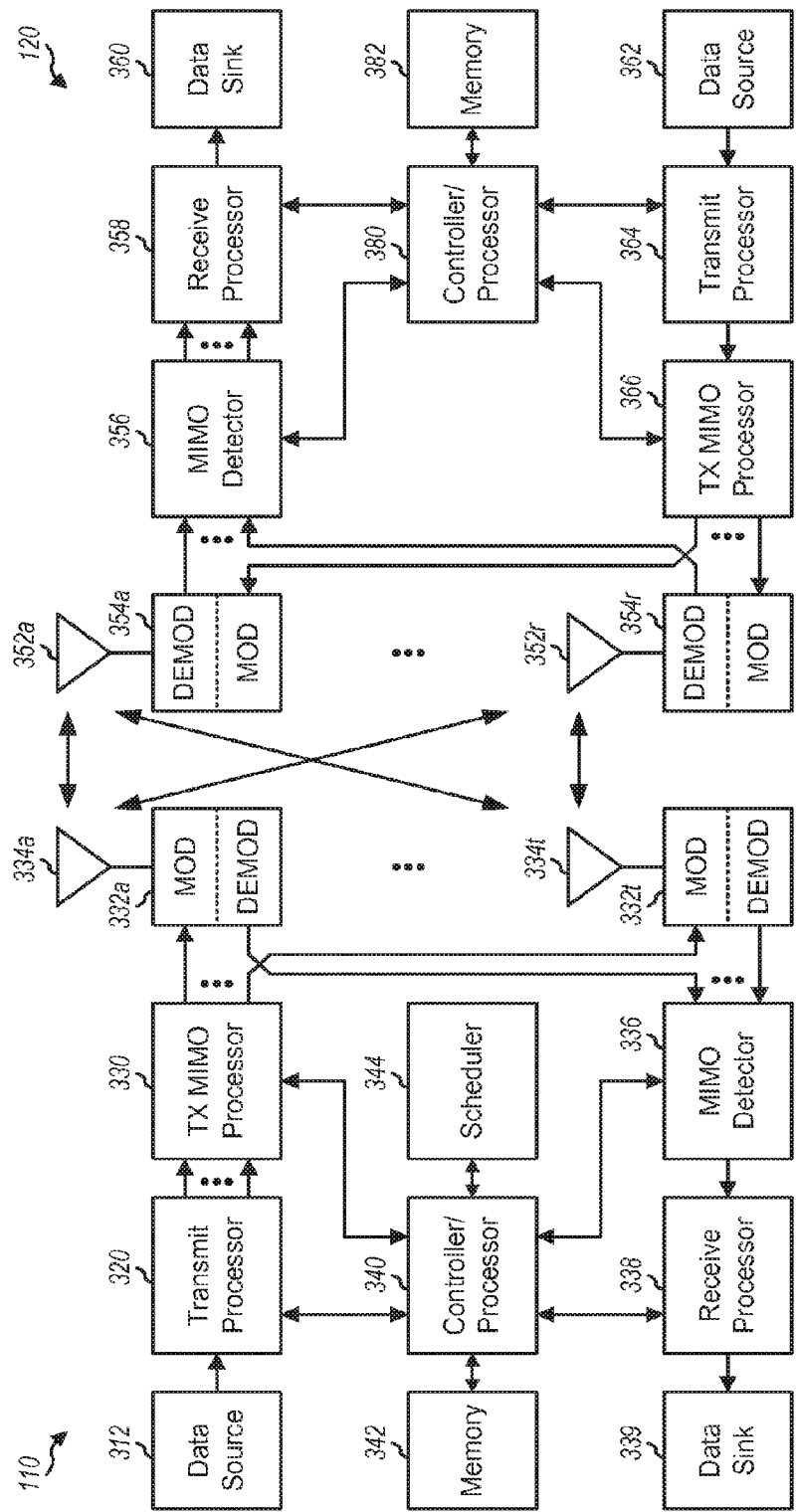
FIG. 3 is a block diagram conceptually illustrating a design of a base station/eNB and a UE.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type such as an access point including a femtocell, a picocell, etc. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of functional blocks, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

In accordance with one or more embodiments of the present disclosure, there are provided techniques for assignment of interference measurement resources in LTE. Assignment of LTE Rel-11 interference measurement resource may require careful network planning which may be undesirable in some cases. This disclosure presents a pseudo-random procedure to perform this assignment based on a (virtual) cell ID which avoids the need for network planning.

LTE may support interference measurement on a newly introduced, dedicated resource. The dedicated resource is introduced as "Interference Measurement Resource (IMR)" in the LTE Rel-11 specification. An IMR represents a set of resource elements (REs) on which the UE measures interference in an implementation-dependent way. An IMR may be given by a 4-port zero power channel state information reference signal (ZP-CSI-RS) resource. The network may be responsible for ensuring that the interference created/measured on the IMR is representative of the interference that the UE will encounter during actual PDSCH transmissions.

IMR allocation by the network may follow two paradigms. In one paradigm, judicious assignment of IMRs may be based on careful network planning. This may require significant planning effort but may achieve superior performance as IMRs may be optimized for specific interference hypotheses. In a second paradigm, assignment of IMRs may be based on a randomized assignment without network planning. The assignment of IMRs may be based on a form of cell ID (details below). This assignment avoids the need for network planning. Good performance may be achieved as long as the assignment procedures avoid undesired overlap between IMRs.

Without randomization, an IMR may consist of the four resource elements defined by one ZP-CSI-RS resource. IMR assignment may be performed by selecting two ZP-CSI-RS resources and distributing the four resource elements (REs) of the IMR among the eight resource elements (REs) defined by the two ZP-CSI-RS resources. Without deciding how the assignment of the four resource elements out of the eight resource elements should be performed, there is a possibility that two IMRs may overlap by three or more resource elements (REs) which is undesirable. Further, signaling may need to be determined for the assignment of the IMRs.

To avoid these shortcomings, in an embodiment, assignment of IMRs may be tied to a (virtual) cell ID. Also, it can be designed such that any two IMRs may overlap by at most two resource elements (REs). This method minimizes planning effort associated with IMRs. As noted above, the selection of the resource elements (REs) used for interference measurement may be based on some form of cell ID. The possible options may include:

each IMR could be associated with a new virtual cell ID (e.g., in the range from 0-503);

each IMR may use the same virtual cell ID as a non-zero power channel state information reference signal (NZP-CSI-RS) with configured index; or the IMR may use the physical cell ID of the serving cell (it is noted that this may not be the preference in same-cell scenarios).

Time domain hopping may be beneficially employed with the selection of resource elements changing on a per-subframe basis. The cell ID which configures the IMR resource elements (as described above) may be subframe dependent, i.e., it may change from subframe to subframe. The sequence of cell ID values may follow a signaled or predetermined hopping pattern. Alternatively, the cell ID in a given subframe may be derived based on adding the subframe number (or some function thereof) to a signaled baseline cell ID (modulo the maximum range of cell IDs). Another design objective may be to minimize a worst-case overlap between IMR resource elements associated with different virtual cell IDs. The embodiments herein target a worst case overlap of two resource elements (REs).

Figure 4A:
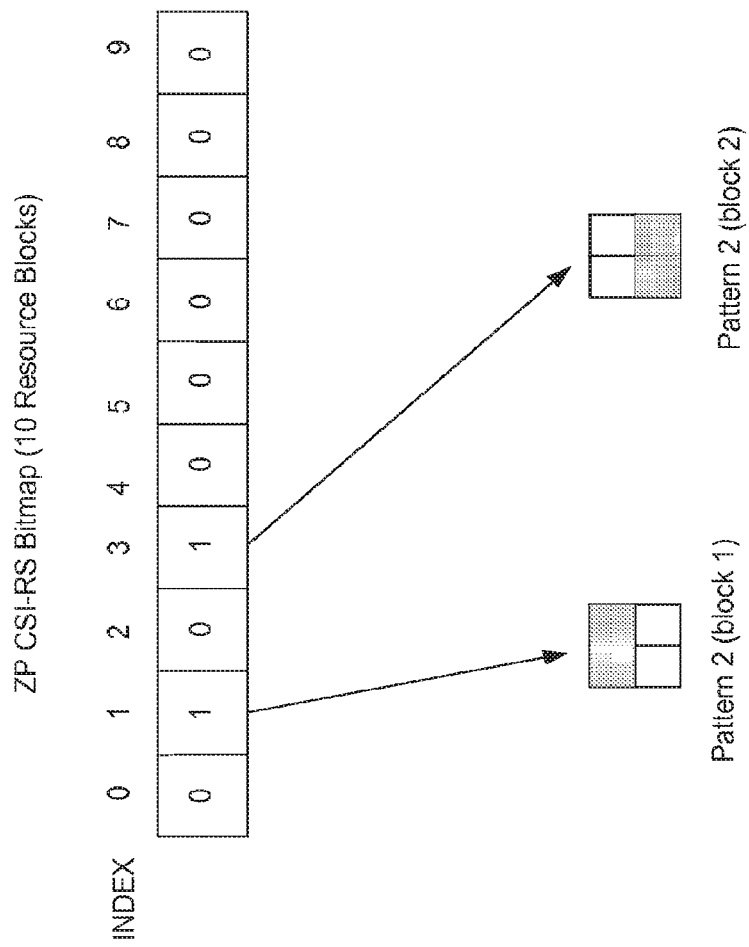
FIGS. 4A-C illustrate resource element assignments using a two Stage process.
Figure 4B:
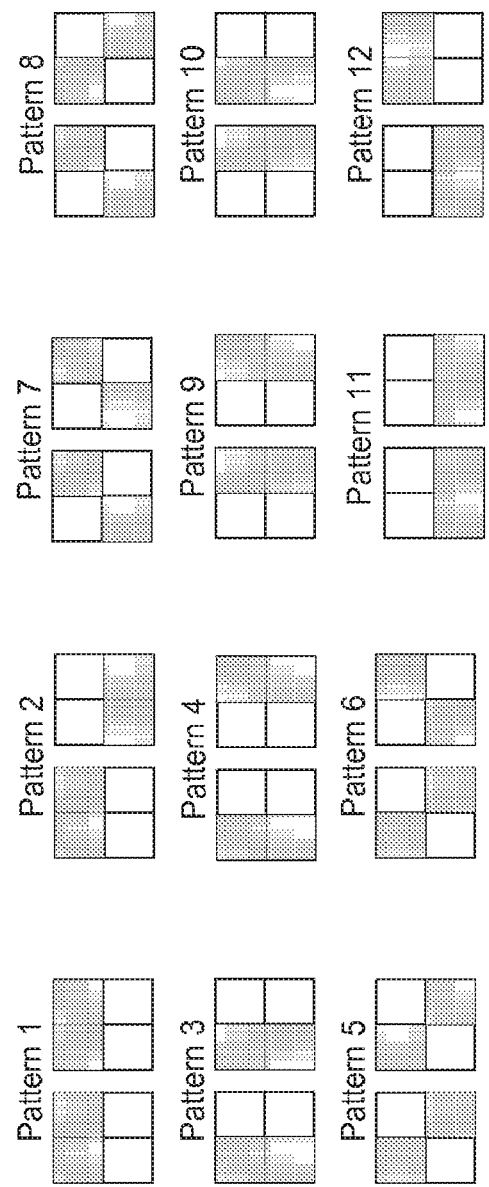
Figure 4C:
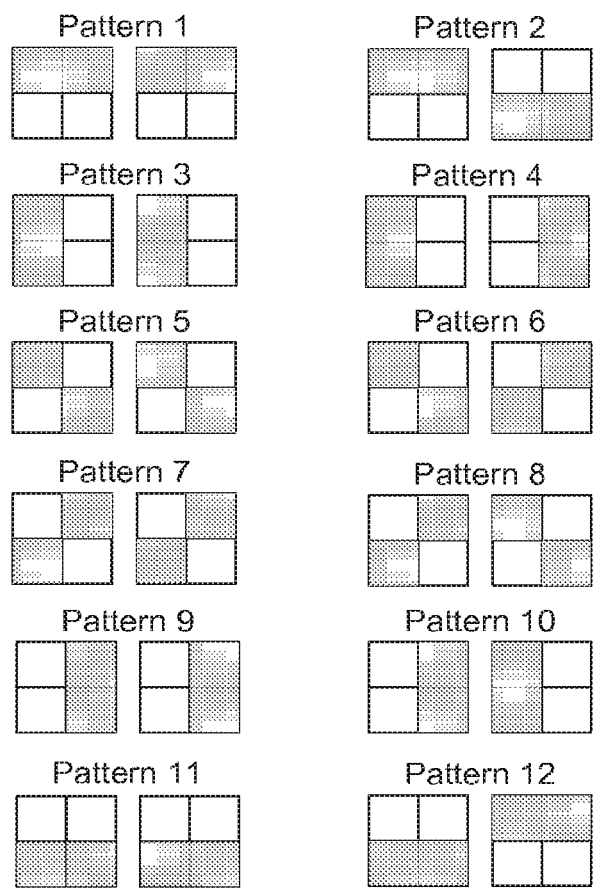

FIGS. 4A-C illustrate resource element assignments using a two stage process. Randomization of the IMR may consist of two stages. Illustrated in FIG. 4A is Stage 1, where two out of a total of ten ZP-CSI-RS resources are selected. In the example of FIG. 4A, ten ZP-CSI-RS resources from index zero through nine are shown. The two resources with index values of 1 and 3 are selected. The two resources use the two blocks of Pattern 2 (shown in FIG. 4B). Each ZP-CSI-RS resource is defined by a block of four resource elements as in the LTE specification. Picking two out of ten yields forty five different combinations (ten choose two). Illustrated in FIG. 4B is Stage 2, where judicious resource element assignment is performed. Judicious resource element assignment within the two selected ZP-CSI-RS resources according to the "codebook" as illustrated. No two pairs of patterns overlap by more than two resource elements.

The construction of the Stage 2 patterns (as illustrated in FIGS. 4B-C) may be based on an enumeration. For example, the enumeration of odd numbered patterns (i.e., Patterns 1, 3, 5, 7, 9, 11) may be defined by [AA], where A defines an assignment of two resources to a resource block. There are six possible ways of assigning two resources to a resource block with four resource elements (four choose two). [AA] defines two resource blocks with the sub-pattern A in a first (or left) resource block repeated in the second (or right) resource block. For example, the enumeration of even numbered patterns (i.e., Patterns 2, 4, 6, 8, 10, 12) may be defined by [A$\bar{A}$]. $\bar{A}$ is the complement or inversion of A. Thus, [A$\bar{A}$] defines two resource blocks with the sub-pattern A in a first (or left) resource block inverted in the second (or right) resource block. In the odd numbered patterns, there are 4 choose $$2\binom{4}{2} \text{ combinations} = 6 \text{ (i.e., (1, 2), (1, 3), (1, 4), (2, 3), (2, 4), (3, 4))}.$$

In the even numbered patterns, there are also 4 choose $$2\binom{4}{2} \text{ combinations} = 6.$$

The total number of odd and even numbered patterns is $$2 \times \binom{4}{2} = 12.$$

The assignment process above may satisfy the design constraint of no more than two resource elements overlapping. If the two out of ten patterns selected in Stage 1 are not identical, then regardless of the Stage 2 pattern selection, there cannot be more than two resource elements overlapping (even if the Stage 2 patterns are the same). This is because for any of the Stage 2 patterns, each half contains only two resource elements. If the two out of ten patterns selected in Stage 1 are identical, then since any pair of two Stage 2 patterns has at most two resource elements overlap, the constraint is also satisfied.

Figure 5A:
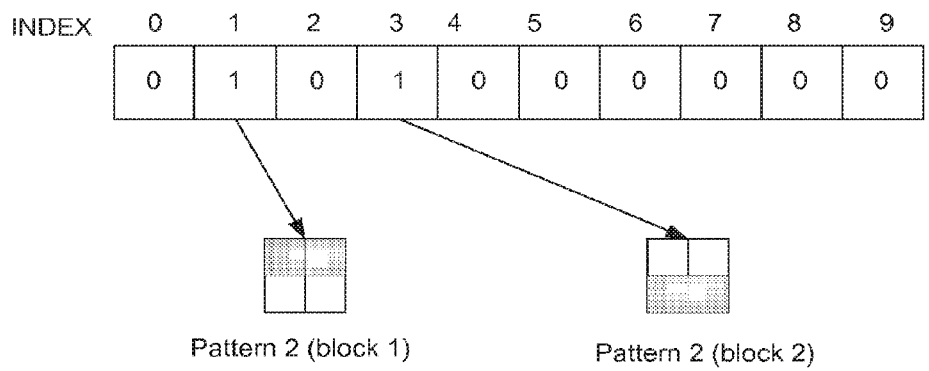
FIGS. 5A-B illustrate resource element assignments for two cells.
Figure 5B:
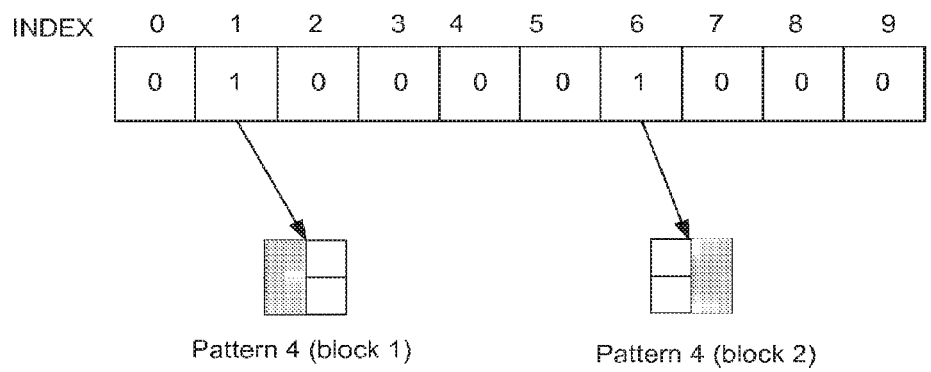
Figure 5C:
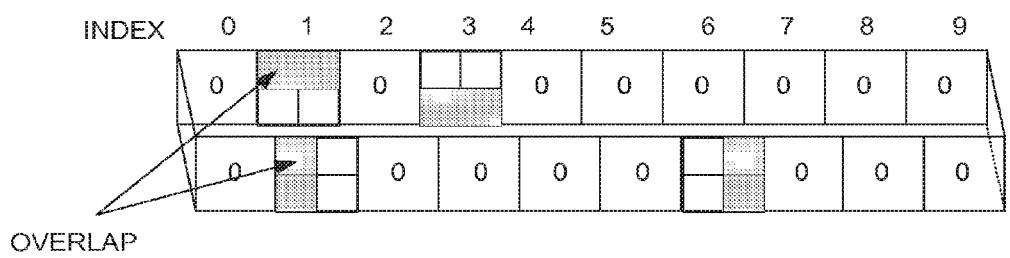
FIG. 5C illustrates possible overlap in resource element assignments for the two cells.
Figure 5D:
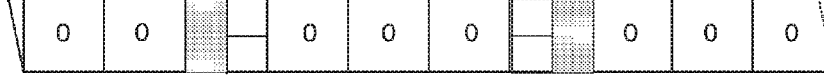
FIGS. 5D-E illustrate different overlapping scenarios for resource element assignments for two cells.

FIGS. 5A-B illustrate resource element assignments for two cells. The first cell, in FIG. 5A, is selected for ZP-CSI-RS resources at index 1 and 3, with Pattern 2 of FIG. 4B. The second cell, in FIG. 5B, is selected for ZP-CSI-RS resources at index 1 and 6, with Pattern 4 of FIG. 4B. The Stage 1 selection for the first and second cells, therefore, has one common or overlapping block (resource at index 1). The ZP-CSI-RS resources may overlap in the resource index 1, as illustrated in FIG. 5C. In this example, one resource element (RE) overlaps in ZP-CSI-RS resources of index 1 (shown in 'OVERLAP' of FIG. 5C). FIG. 5D illustrates an example where there is no overlap in Stage 1 blocks, and FIG. 5E illustrates an example where both Stage 1 blocks overlap.

In FIG. 5D, cells in the Stage 1 process selected two non-overlapping resource blocks. For example, a first cell selected resource blocks at index 1 and 3. A second cell selected resource blocks at index 2 and 6. For Stage 2, the first cell selected Pattern 2, and the second cell selected Pattern 4. In this example, because the Stage 1 resource blocks do not overlap, there may not be any overlapping resource elements for the two cells. Thus, in cases where Stage 1 blocks are non-overlapping, no resource elements may overlap, and the constraint for no more than two overlapping resource elements is satisfied.

Figure 5E:

In FIG. 5E, cells in the Stage 1 process selected two overlapping resource blocks. For example, a first cell selected resource blocks at index 1 and 3. A second cell selected resource blocks at index 1 and 3. For Stage 2, the first cell selected Pattern 2, and the second cell selected Pattern 4. In this example, both Stage 1 resource blocks (index 1 and 3) overlap. If the resource elements within the blocks were randomly selected, the resource elements may overlap by any number of resource elements from zero to four. However, because the Stage 2 resource elements are judiciously assigned as shown in Pattern 1 through Pattern 12 in FIGS. 4B and 4C, the resource elements in FIG. 5E may not overlap by more than two resource elements. The resource block at index 1 has an overlap at the top left corner. The resource block at index 3 has an overlap at the bottom right corner. This results in an overlap of only two resource elements (REs), and the constraint for no more than two overlapping resource elements is satisfied.

The achievable reuse factor reflects the achievable degree of randomization. There are forty five Stage 1 patterns. There are twelve Stage 2 patterns. The combination of the Stage 1 and Stage 2 patterns yields 45×12=540 possible options, which is greater than 504 (the cell ID range). Thus, there may be more combinations of the resource assignments than the range of cell IDs.

The mapping from a specific IMR virtual cell ID to a Stage 1 and Stage 2 pattern may be performed through enumeration. For example, it is assumed a virtual cell ID=x. The index of the Stage 1 pattern is given by the function: floor(x/12). The floor function gives the largest integer not greater than a value. For example, the floor of 2.5 is 2. The index of the Stage 2 pattern is given by the function: mod(x, 12). The modulo (or mod) function gives the remainder of a division operation. For example, 8 mod 5 is 3. Further details of the disclosure are provided below.

The concept of an interference measurement resource (IMR) was introduced in Rel-11 to provide for dedicated resource elements on which the UE can be configured to measure interference. IMR may consist of four resource elements which, by default, consist of the four resource elements of a ZP CSI-RS resource. Although a reuse factor of ten is achievable with ZP CSI-RS resources in a single subframe, a judicious assignment of IMRs based on careful network planning may be important. An alternative assignment approach may include the four resource elements of an IMR being distributed in a pseudo-random way over multiple ZP CSI-RS resources. The reuse factor may thus be increased dramatically while constraining the worst-case overlap between pseudo-randomly assigned IMRs. The objective is to avoid the need for cell planning.

There may be a specific way of performing this pseudo-random assignment. The proposal stated that the four resource elements of an IMR may be distributed over two ZP-CSI-RS resources and that the resource element assignment within those ZP CSI-RS resources would be pseudo-random. More details are provided on how the assignment procedure could be performed below. For example, some form of cell ID may be introduced to serve as a seed for this pseudo-random assignment. Further, an example is provided of how the assignment within the selected two ZP-CSI-RS resource could be performed such that a worst-case overlap of two resource elements is satisfied. In particular, the following two-stage procedure may be followed:

Stage 1: Pick two out of ten ZP-CSI-RS resources. This gives a total of forty five different combinations (ten choose two).

Stage 2: Pick four resource elements out of the eight resource elements defined by the selected two ZP CSI-RS resources. The selection is performed by picking one of the twelve patterns shown in FIGS. 4B-C.

The patterns (e.g., Pattern 1 through Pattern 12 illustrated in FIGS. 4B-C) are constructed in a way that ensures that no more than two resource elements overlap between any two patterns. Indeed, it is easy to see that the twelve patterns in FIGS. 4B-C satisfy this property. As to the construction of the patterns, the following approach may be used. Starting from the six (namely four choose two) possible ways of allocating two resource elements to a single ZP CSI-RS resource (say, the left group within each pattern) we construct the odd numbered patterns by duplicating the pattern and the even numbered patterns by grouping the left pattern with its inverted pattern. This yields a total of twelve patterns which exhausts all possible ways of allocating RFs such that no more than two resource elements overlap.

The reuse factor achievable by this assignment approach totals 540 (=45×12) patterns which exceeds the total number of cell IDs, which may be design constraint. Therefore, it seems natural to perform the pseudo-random assignment of the resources based on some form of "IMR cell ID," either by introducing such a parameter explicitly or by tying it to some existing (virtual) cell ID (e.g., the virtual cell ID associated with one of the NZP CSI-RS resources). Assuming a given cell ID x (with range 0<=x<=503), the RE allocation is given as follows:

Stage 1: The selection of the two out of ten resources is given by enumerating all forty five combinations and selecting the one with floor(x/12).

Stage 2: The index of the pattern selected as part of Stage 2 is given by mod(x,12).

It may be seen that the assignment process satisfies the constraint of no more than two resource elements (REs) overlapping between any two IMRs with different cell ID. To see this, we use the following argument:

If the two out of ten patterns selected in Stage 1 are not identical, then regardless of the Stage 2 pattern, there cannot be more than two resource elements overlap as each of the Stage 2 patterns occupies at most two resource elements in each of the two ZP CSI-RS resources.

If the two out of ten patterns selected in Stage 1 are identical, then since any pair of the two Stage 2 patterns has at most two resource elements (REs) overlapping, the design constraint is also satisfied.

The present disclosure provides techniques and methods for assigning interference measurement resources (IMRs) including the following proposals. Adoption of the pseudo-random IMR assignment procedure may avoid cell planning by tying the IMR allocation to some form or (virtual) cell ID. Selection of the IMR REs may be performed according to the two-step procedure outlined above which ensures a worst-case overlap of two resource elements (REs).

In accordance with one or more aspects of the embodiments described herein, with reference to FIG. 6, there is shown a methodology 600, operable by a user entity, such as, for example, a UE, a terminal, a mobile station, a subscriber unit, a station, or the like. Specifically, method 600 describes a procedure to measure interference resources. The method 600 may involve, at 602, receiving at least one identifier wherein the at least one identifier determines, at least in part, at least one interference measurement resource that partially overlaps with another at least one interference measurement resource. For example, the at least one interference measurement resource may include a number of resource elements out of a set of resource elements. The method 600 may involve, at 604, measuring interference based at least in part on the at least one interference measurement resource.

Figure 7:
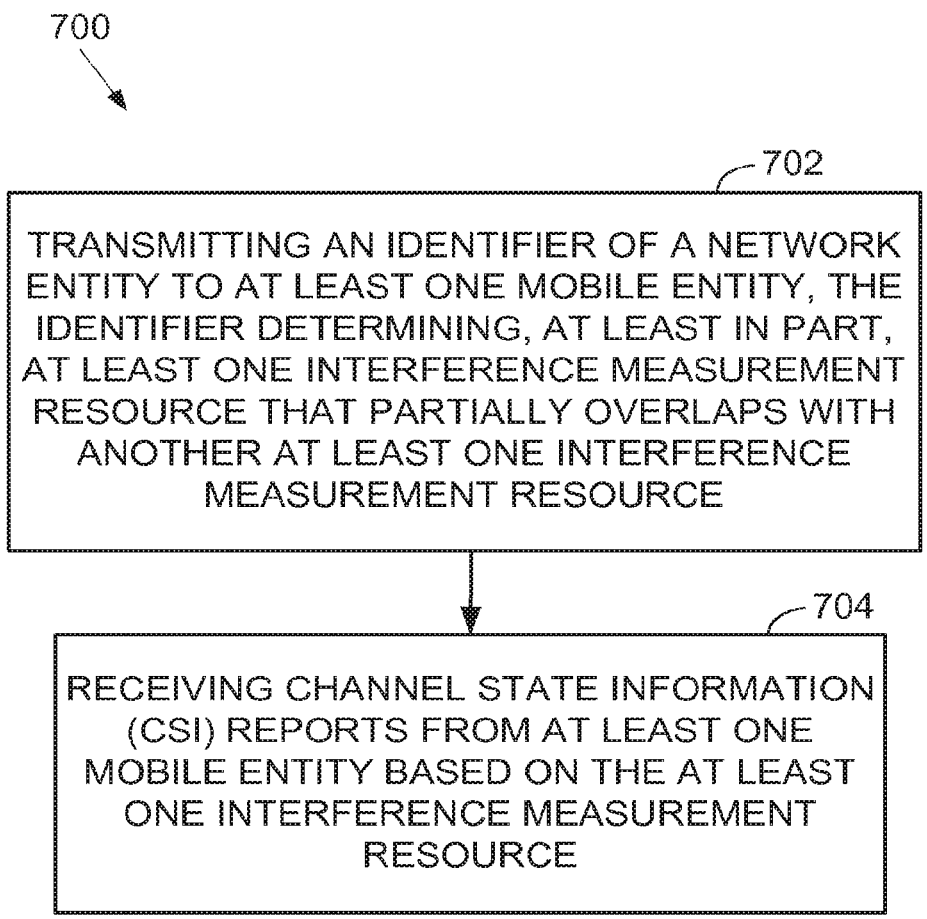
FIG. 7 illustrates an exemplary methodology for assigning interference measurement resources.

With reference to FIG. 7, there is shown a methodology 700, operable by a network entity, such as, for example, a femtocell, a macrocell, a picocell, or the like. Specifically, method 700 describes a procedure to assign interference measurement resources. The method 700 may involve, at 702, transmitting an identifier of a network entity to at least one mobile entity, the identifier determining, at least in part, at least one interference measurement resource that partially overlaps with another at least one interference measurement resource. For example, the at least one interference measurement resource may include a number of resource elements out of a set of resource elements. The method 700 may involve, at 704, receiving channel state information (CSI) reports from at least one mobile entity based on the at least one interference measurement resource.

Figure 8:
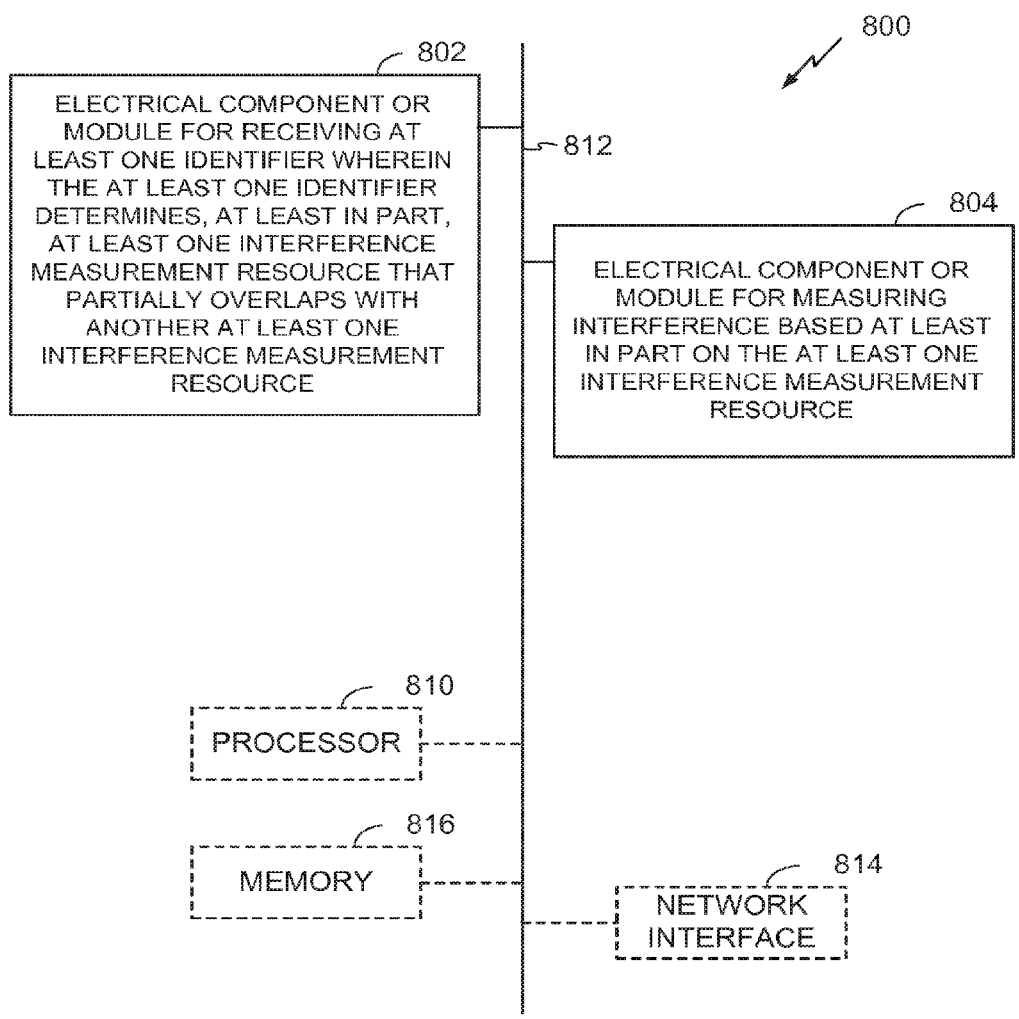
FIG. 8 shows an embodiment of an apparatus for measuring interference resources, in accordance with the methodology of FIG. 6.

FIG. 8 shows an embodiment of an apparatus for measure interference resources, in accordance with the methodology of FIG. 6. With reference to FIG. 8, there is provided an exemplary apparatus 800 that may be configured as a user entity (e.g., a UE, a terminal, a mobile station, a subscriber unit, a station, or the like) in a wireless network, or as a processor or similar device/component for use within the network entity. For example, apparatus 800 may be or may include UE 120 of FIG. 3. The apparatus 800 may include functional blocks that may represent functions implemented by a processor, software, or combination thereof (e.g., firmware). For example, apparatus 800 may include an electrical component or module 802 for receiving at least one identifier wherein the at least one identifier determines, at least in part, at least one interference measurement resource that partially overlaps with another at least one interference measurement resource. For example, electrical component or module 802 may be configured for receiving the at least one interference measurement resource, where the least one interference measurement resource comprises a number of resource elements out of a set of resource elements. Electrical component or module 802 may be, or may include, means for receiving at least one identifier wherein the at least one identifier determines, at least in part, at least one interference measurement resource that partially overlaps with another at least one interference measurement resource. Electrical component or module 802 may be, or may include at least one of antennas 352a through 352r, or at least one of antennas 352a through 352r coupled to any of receive processor 358 and/or processor 380.

The apparatus 800 may include an electrical component or module 804 for measuring interference based at least in part on the at least one interference measurement resource. Electrical component or module 804 may be, or may include, means for measuring interference based at least in part on the at least one interference measurement resource. Electrical component or module 804 may be, or may include at least one of antennas 352a through 352r, or at least one of antennas 352a through 352r coupled to any of receive processor 358 and/or processor 380.

In related aspects, the apparatus 800 may optionally include a processor component 850 having at least one processor, in the case of the apparatus 800 configured as a user entity (e.g., a UE, a terminal, a mobile station, a subscriber unit, a station, or the like), rather than as a processor. The processor 850, in such case, may be in operative communication with the components 802-804 via a bus 852 or similar communication coupling. The processor 850 may effect initiation and scheduling of the processes or functions performed by electrical components 802-804.

In further related aspects, the apparatus 800 may include a radio transceiver component 854. A stand alone receiver and/or stand alone transmitter may be used in lieu of or in conjunction with the transceiver 854. When the apparatus 800 is a network entity, the apparatus 800 may also include a network interface (not shown) for connecting to one or more core network entities. The apparatus 800 may optionally include a component for storing information, such as, for example, a memory device/component 856. The computer readable medium or the memory component 856 may be operatively coupled to the other components of the apparatus 800 via the bus 852 or the like. The memory component 856 may be adapted to store computer readable instructions and data for effecting the processes and behavior of the components 802-804, and subcomponents thereof, or the processor 850, or the methods disclosed herein. The memory component 856 may retain instructions for executing functions associated with the components 802-804. While shown as being external to the memory 856, it is to be understood that the components 802-804 can exist within the memory 856. It is further noted that the components in FIG. 8 may comprise processors, electronic devices, hardware devices, electronic sub-components, logical circuits, memories, software codes, firmware codes, etc., or any combination thereof.

Figure 9:
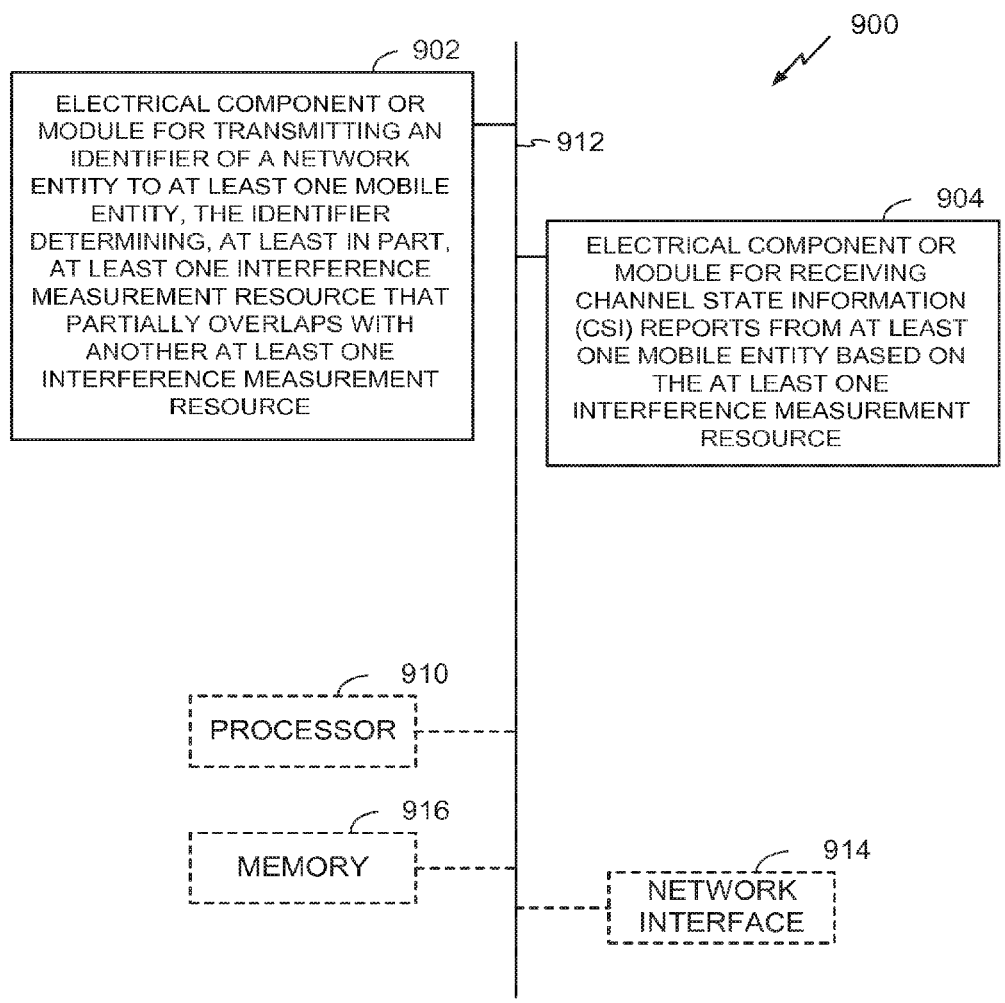
FIG. 9 shows an embodiment of an apparatus for assigning interference measurement resources, in accordance with the methodology of FIG. 7.

FIG. 9 shows an embodiment of an apparatus for assigning interference measurement resources, in accordance with the methodology of FIG. 7. With reference to FIG. 9, there is provided an exemplary apparatus 900 that may be configured as a network entity (e.g., a femtocell, a macrocell, a picocell, or the like) in a wireless network, or as a processor or similar device/component for use within the network entity. For example, apparatus 900 may be, or may include, base station 110 of FIG. 3. The apparatus 900 may include functional blocks that can represent functions implemented by a processor, software, or combination thereof (e.g., firmware). For example, apparatus 900 may include an electrical component or module 902 for transmitting an identifier of a network entity to at least one mobile entity, the identifier determining, at least in part, at least one interference measurement resource that partially overlaps with another at least one interference measurement resource. For example, the at least one interference measurement resource may include a number of resource elements out of a set of resource elements. Electrical component or module 902 may be, or may include, means for transmitting an identifier of a network entity to at least one mobile entity, the identifier determining, at least in part, at least one interference measurement resource that partially overlaps with another at least one interference measurement resource. Electrical component or module 902 may be, or may include at least one of antennas 334a through 334t, or at least one of antennas 334a through 334t coupled to any of transmit processor 320 and/or processor 340.

The apparatus 900 may include an electrical component or module 904 for receiving channel state information (CSI) reports from at least one mobile entity based on the at least one interference measurement resource. Electrical component or module 904 may be, or may include, means for receiving channel state information (CSI) reports from at least one mobile entity based on the at least one interference measurement resource. Electrical component or module 904 may be, or may include, at least one of antennas 334*a* through 334*t*, or at least one of antennas 334*a* through 334*t* coupled to any of transmit processor 320 and/or processor 340.

In related aspects, the apparatus 900 may optionally include a processor component 950 having at least one processor, in the case of the apparatus 900 configured as a network entity (e.g., a femtocell, a macrocell, a picocell, or the like), rather than as a processor. The processor 950, in such case, may be in operative communication with the components 902-904 via a bus 952 or similar communication coupling. The processor 950 may effect initiation and scheduling of the processes or functions performed by electrical components 902-904.

In further related aspects, the apparatus 900 may include a radio transceiver component 954. A stand alone receiver and/or stand alone transmitter may be used in lieu of or in conjunction with the transceiver 954. When the apparatus 900 is a network entity, the apparatus 900 may also include a network interface (not shown) for connecting to one or more core network entities. The apparatus 900 may optionally include a component for storing information, such as, for example, a memory device/component 956. The computer readable medium or the memory component 956 may be operatively coupled to the other components of the apparatus 900 via the bus 952 or the like. The memory component 956 may be adapted to store computer readable instructions and data for effecting the processes and behavior of the components 902-904, and subcomponents thereof, or the processor 950, or the methods disclosed herein. The memory component 956 may retain instructions for executing functions associated with the components 902-904. While shown as being external to the memory 956, it is to be understood that the components 902-904 can exist within the memory 956. It is further noted that the components in FIG. 9 may comprise processors, electronic devices, hardware devices, electronic sub-components, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM. CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, the method comprising:
    transmitting an identifier of a network entity to at least one mobile entity, the identifier determining, at least in part, at least one interference measurement resource that partially overlaps with another at least one interference measurement resource, wherein the at least one interference measurement resource comprises a number of resource elements out of a set of resource elements; and
    receiving a channel state information (CSI) report from at least one mobile entity based on the at least one interference measurement resource;
    wherein the identifier is one of a virtual cell ID associated with the at least one interference measurement resource, an index pointing to the virtual cell ID of a non-zero-power channel state information reference signal (NZP CSI-RS) resource in a Coordinated Multi-Point (COMP) measurement set, or a physical cell ID.

2. The method of claim 1, wherein the at least one interference measurement resource overlaps by no more than two resource elements with resource elements of the another at least one interference measurement resource determined by another identifier of another network entity.

3. The method of claim 1, further comprising: selecting two resource blocks from a set of resource blocks based, at least in part, on the identifier; and selecting four resource elements from the two resource blocks based, at least in part, on the identifier, wherein the received CSI report is further based on the four resource elements.

4. The method of claim 1, wherein the identifier determines, at least in part, at least one interference measurement resource based on an enumerated set of resource assignments.

5. The method of claim 4, wherein the enumerated set of resource assignments comprises resource assignments defined by a repetition of a sub-pattern.

6. The method of claim 4, wherein the enumerated set of resource assignments comprises resource assignments defined by an inversion of a sub-pattern.

7. The method of claim 1, wherein the set of resource elements is associated with zero-power channel state information reference signal (ZP CSI-RS) resources.

8. A wireless communication apparatus comprising:
    at least one processor configured to:
    transmit an identifier of a network entity to at least one mobile entity, the identifier determining, at least in part, at least one interference measurement resource that partially overlaps with another at least one interference measurement resource, wherein the at least one interference measurement resource comprises a number of resource elements out of a set of resource elements, and
    receive a channel state information (CSI) report from at least one mobile entity based on the at least one interference measurement resource; and a
    memory coupled to the at least one processor for storing data;
    wherein the at least one identifier is one of a virtual cell ID defined for the at least one interference measurement resource, an index pointing to the virtual cell ID of a non-zero-power channel state information reference signal (NZP CSI-RS) resource in a Coordinated Multi-Point (CoMP) measurement set, or a physical cell ID.

9. The wireless communication apparatus of claim 8, wherein the at least one interference measurement resource overlaps by no more than two resource elements with resource elements of the another at least one interference measurement resource determined by another identifier of another network entity.

10. The wireless communication apparatus of claim 8, wherein the at least one processor is further configured to: select two resource blocks from a set of resource blocks based, at least in part, on the identifier, and select four resource elements from the two resource blocks, wherein the received CSI report is further based on the four resource elements.

11. The wireless communication apparatus of claim 8, wherein the identifier determines, at least in part, at least one interference measurement resource based on an enumerated set of resource assignments.

12. The wireless communication apparatus of claim 11, wherein the enumerated set of resource assignments comprises resource assignments defined by a repetition of a sub-pattern.

13. The wireless communication apparatus of claim 11, wherein the enumerated set of resource assignments comprises resource assignments defined by an inversion of a sub-pattern.

14. A wireless communication apparatus comprising:
    means for transmitting an identifier of a network entity to at least one mobile entity, the identifier determining, at least in part, at least one interference measurement resource that partially overlaps with another at least one interference measurement resource, wherein the at least one interference measurement resource comprises a number of resource elements out of a set of resource elements; and
    means for receiving a channel state information (CSI) report from at least one mobile entity based on the at least one interference measurement resource;
    wherein the at least one identifier is one of a virtual cell ID defined for the at least one interference measurement resource, an index pointing to the virtual cell ID of a non-zero-power channel state information reference signal (NZP CSI-RS) resource in a Coordinated Multi-Point (COMP) measurement set, or a physical cell ID.

15. The wireless communication apparatus of claim 14, wherein the at least one interference measurement resource overlaps by no more than two resource elements with resource elements of the another at least one interference measurement resource determined by another identifier of another network entity.

16. The wireless communication apparatus of claim 14, further comprising: means for selecting two resource blocks from a set of resource blocks based, at least in part, on the identifier, and means for selecting four resource elements from the two resource blocks, wherein the received CSI report is further based on the four resource elements.

17. The wireless communication apparatus of claim 14, wherein the identifier determines, at least in part, at least one interference measurement resource based on an enumerated set of resource assignments.

18. The wireless communication apparatus of claim 17, wherein the enumerated set of resource assignments comprises resource assignments defined by a repetition of a sub-pattern.

19. The wireless communication apparatus of claim 17, wherein the enumerated set of resource assignments comprises resource assignments defined by an inversion of a sub-pattern.

20. A non-transitory computer-readable medium comprising code for causing at least one computer to:
- transmit an identifier of a network entity to at least one mobile entity, the identifier determining, at least in part, at least one interference measurement resource that partially overlaps with another at least one interference measurement resource, wherein the at least one interference measurement resource comprises a number of resource elements out of a set of resource elements; and
- receive a channel state information (CSI) report from at least one mobile entity based on the at least one interference measurement resource;
- wherein the at least one identifier is one of a virtual cell ID defined for the at least one interference measurement resource, an index pointing to the virtual cell ID of a non-zero-power channel state information reference signal (NZP CSI-RS) resource in a Coordinated Multi-Point (CoMP) measurement set, or a physical cell ID.

21. The non-transitory computer-readable medium of claim 20, wherein the at least one interference measurement resource overlaps by no more than two resource elements with resource elements of the another at least one interference measurement resource determined by another identifier of another network entity.

22. The non-transitory computer-readable medium of claim 20, wherein the computer-readable medium further comprises code for causing the at least one computer to: select two resource blocks from a set of resource blocks based, at least in part, on the identifier, and select four resource elements from the two resource blocks, wherein the received CSI report is further based on the four resource elements.

23. The non-transitory computer-readable medium of claim 20, wherein the identifier determines, at least in part, at least one interference measurement resource based on an enumerated set of resource assignments.

24. The non-transitory computer-readable medium of claim 23, wherein the enumerated set of resource assignments comprises resource assignments defined by a repetition of a sub-pattern.

25. The non-transitory computer-readable medium of claim 23, wherein the enumerated set of resource assignments comprises resource assignments defined by an inversion of a sub-pattern.

* * * * *